July 13, 1954 R. CHILTON 2,683,494
PROPELLER
Filed Dec. 24, 1949 3 Sheets-Sheet 1
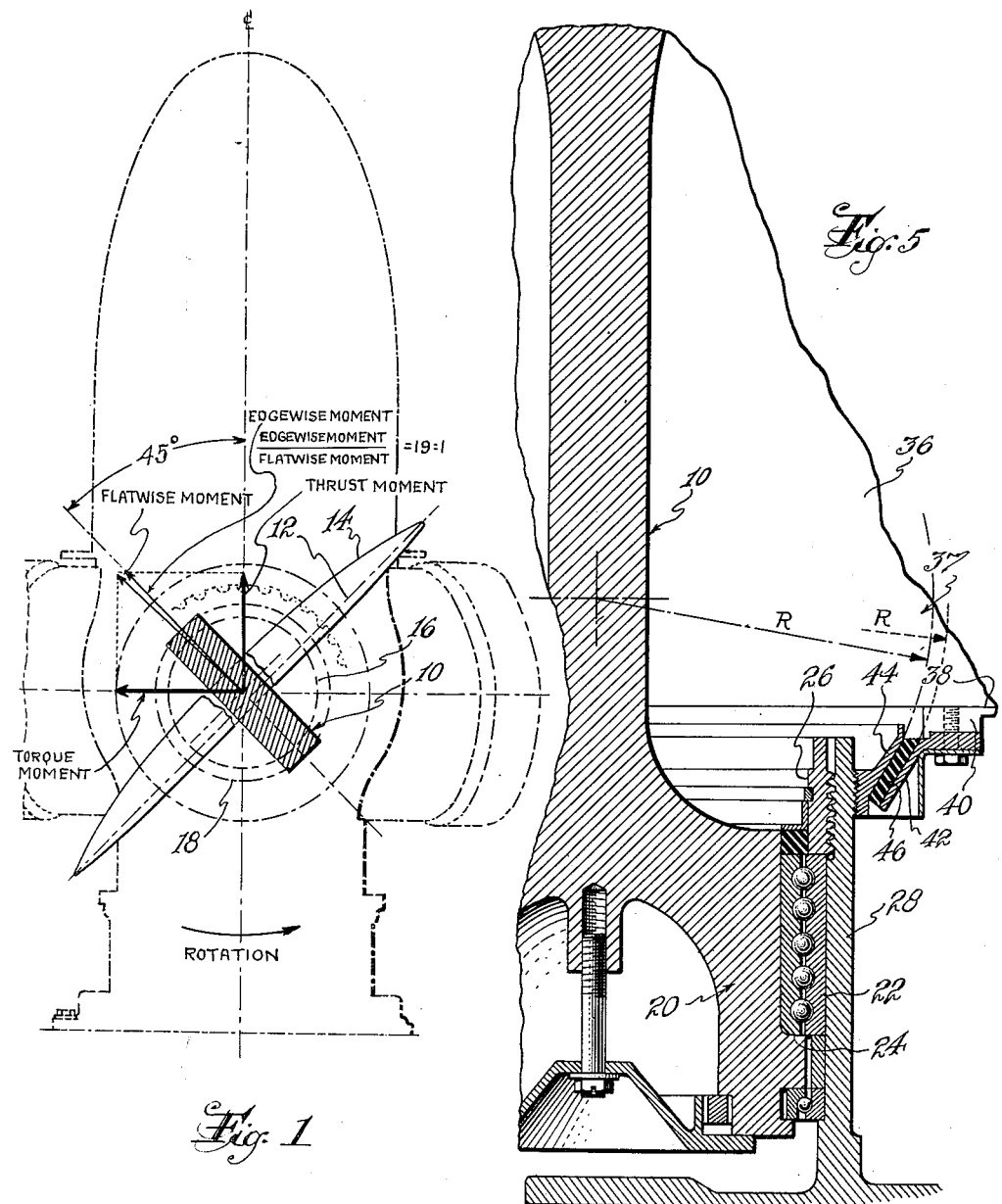

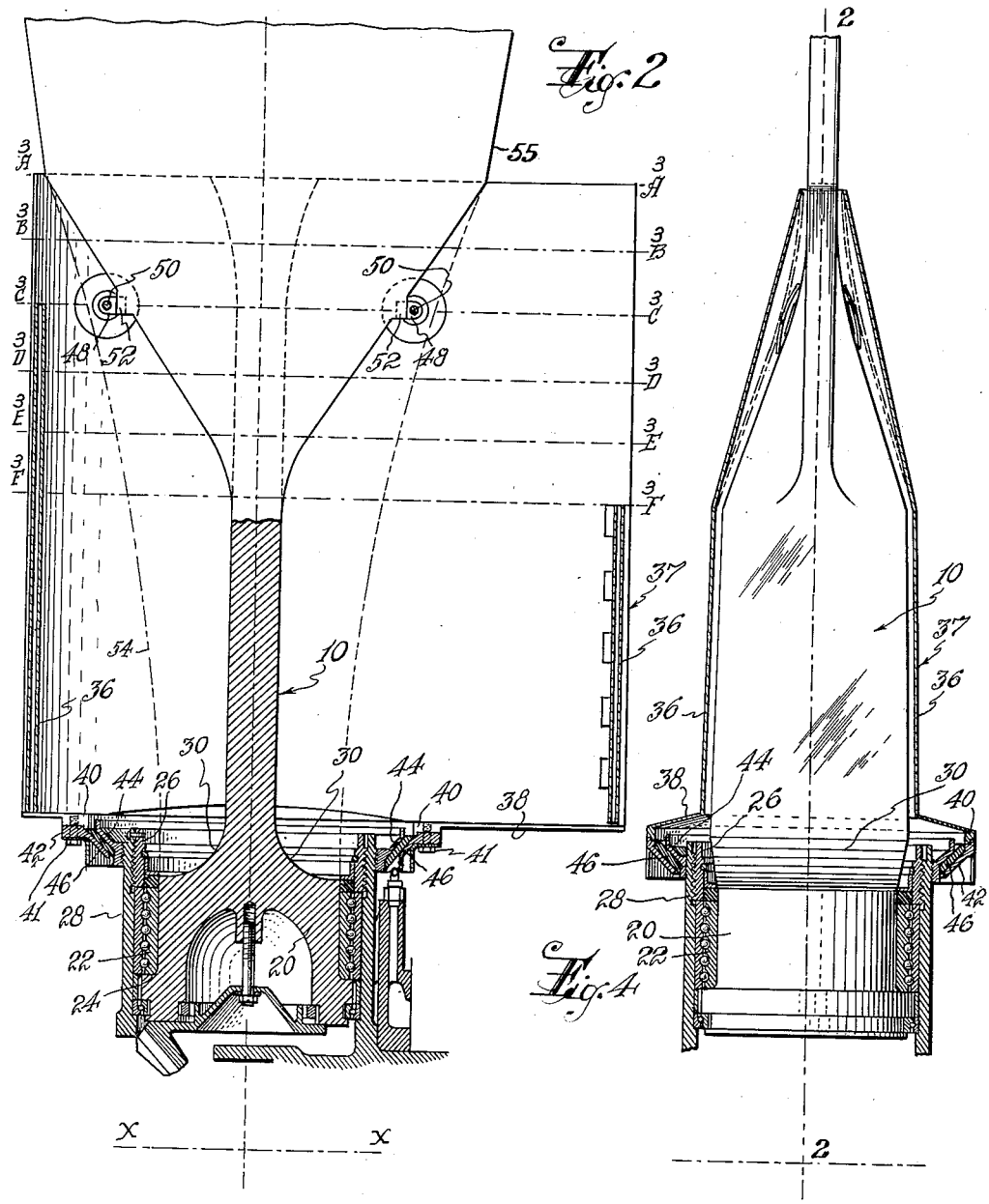

July 13, 1954  R. CHILTON  2,683,494
PROPELLER
Filed Dec. 24, 1949  3 Sheets-Sheet 3
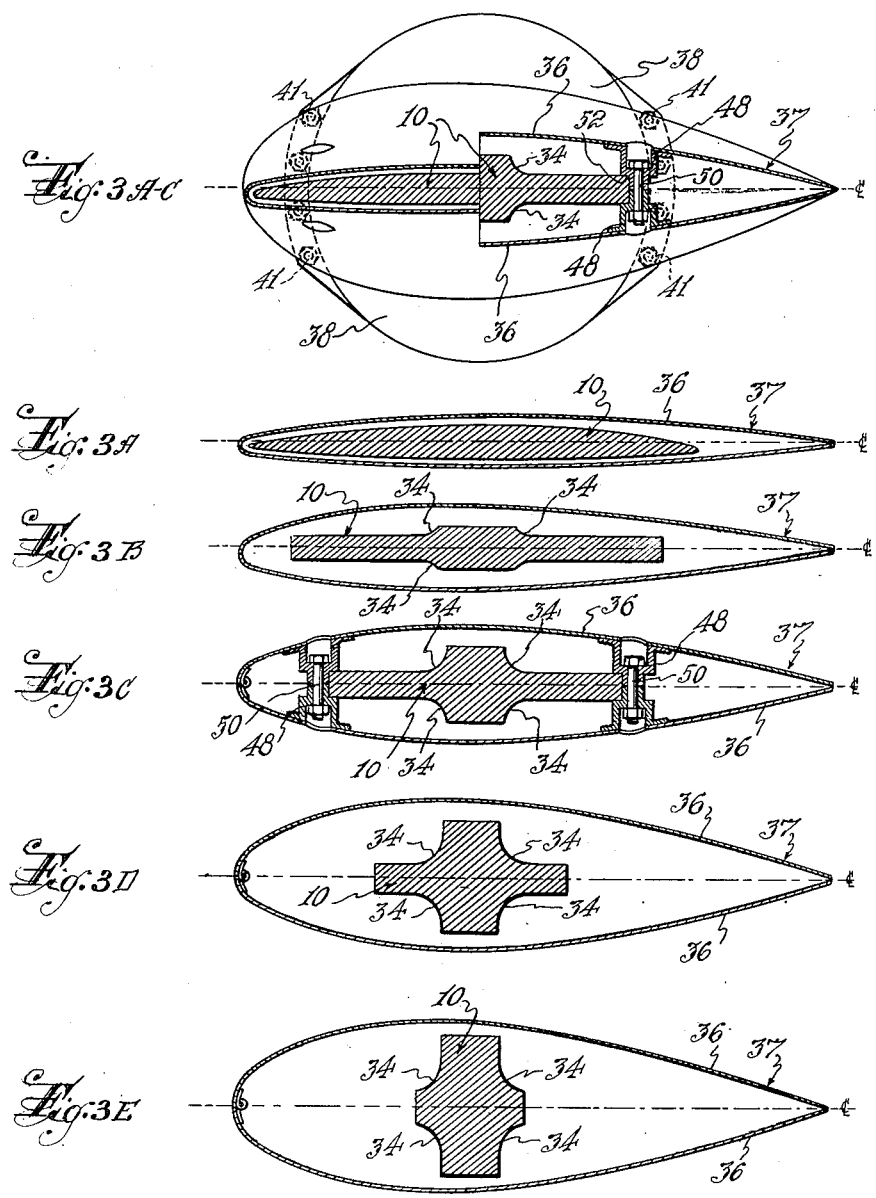

Patented July 13, 1954

2,683,494

UNITED STATES PATENT OFFICE 2,683,494

PROPELLER

Roland Chilton, Glen Rock, N. J.

Application December 24, 1949, Serial No. 134,961

22 Claims. (Cl. 170—159)

This invention relates to propellers, the preferred embodiment of the showings illustrating the invention as applied to a variable pitch aircraft engine propeller.

The steady aerodynamic, centrifugal, and other non-vibratory forces acting on a propeller are well understood and give little difficulty in design or operation. Vibratory stresses on the other hand, are usually unpredictable and are the prime cause of failures in propeller hubs, blades and in blade retention means.

Propeller blades are elastic cantilever structures usually having several modes of natural vibration of different frequencies, while aircraft engines and particularly those having conventional articulated connecting rod systems subject the propeller to many different orders of torque variation and shaking forces. Propellers must operate over a wide speed range and propeller vibration records commonly show several operating conditions at which one mode of vibration synchronizes with one of the vibration orders impressed by the engine. Should the damping factor be inadequate, the vibrating stresses become dangerously high and a redesign is required. As the art has developed this has repeatedly resulted in stiffening the propeller blade in the areas where high vibrating stresses are measured and this long-continued line of development has repeatedly resulted in stiffer and heavier blades, particularly at the shank or root.

There are currently in production hollow propeller blades wherein the internal diameter of the shank of each blade is larger than the external diameter of the propeller-shaft which must support and drive all the blades.

Conventional controllable pitch propeller blades are mounted in circular bearing stacks and accordingly the blade shank itself is circular, i. e. the shank has equal bending stiffness in all directions. This shank however merges with the relatively flat airfoil section (i. e., the usual elongate section) of the blade whereof the edgewise stiffness is enormously greater than the stiffness flatwise of the blade. (The ratio may be over 100/1 as compared to the 1/1 stiffness ratio of the shank.) In fact, a conventional propeller blade installation can be widely deflected, flatwise, by mere manual pressure at the tip of the blade.

Deflections in operation engender the centrifugal restoring moments which now relieve the propeller shank, hub and blade retention means of much of the principal aerodynamic bending forces. This inherent flatwise flexibility of propeller blades also introduces substantial aerodynamic damping against flatwise vibration and moreover so reduces the natural flatwise vibration frequency of the blade, that high vibratory shank stresses from flatwise vibration are relatively rare compared to the incidence of high stresses from vibration edgewise of the blade.

The principal aerodynamic forces are flatwise of the blade (substantially normal to the chord of the airfoil section) whereas the aerodynamic force edgewise of the blade (along the chord) is insignificant. In fact there is a direction of zero resultant aerodynamic force on the airfoil section which direction falls within a few degrees of the chord. In other words a conventional propeller blade may be 100 times stiffer in the direction of zero aerodynamic bending moment than in the direction of maximum aerodynamic (lift) bending moment.

In practice, when high vibratory stresses are found in the blade, shank, and retention means, the zones of maximum stress are usually in the direction of maximum blade stiffness—i. e. not far from parallelism to the mean chord.

A prime object of the present invention is to correct this approximately 90° discrepancy between the directions of maximum bending stiffness and maximum bending force on the blade.

An associated object of providing substantial bending flexibility, edgewise of the blade, is to import in this direction also, the centrifugal restoring moment which now relieves the blade shank of bending loads in one direction only (flatwise).

Another object is to provide simple and improved damping means against the fundamental and certain other modes of blade vibration in all directions.

A further object is to reduce the natural frequency of vibration of the blade, edgewise, so that resonance with the major exciting forces will be in or below the low-speed end of the operating range.

Other objects and advantages will be obvious from or pointed out in the following description with reference to the drawings in which—

Fig. 1 is a diagram viewed endwise of the blade, with the flat-section shank of the invention cross-sectioned for clearness, the arcuate dot-dash line forming the top of the device, designating a conventional streamlined dome covering the forward part of the pitch-changing mechanism;

Fig. 2 is a view of a blade shank in part section through in a plane passing the axis X—X of the propeller hub, on line 2—2 of Figure 4;

Figs. 3A–C, 3B, 3C, 3D and 3E are cross-sections on the corresponding lines of Fig. 2;

Fig. 4 is a part-section side view of Fig. 2; and

Fig. 5 is a fragmentary enlarged view showing in detail the blade retention and associated means of Fig. 2.

The round shanks of conventional propellers are usually covered by a cuff or spinner which extends out to the useful airfoil section, to "streamline" the bulky shanks. According to this invention that part of the shank beyond the retention means and beneath the cuff or spinner is made of flat (preferably solid) section indicated at 10 in Fig. 1 and disposed substantially at right angles (i. e., crosswise) to the mean chord 12 of the blade airfoil 14. The dotted circles 16 and 18 illustrate the hollow shank section of the current propeller blade for which the solid flat-section 10 of this invention has been substituted. It will be seen that the cross-section width of this rectangular shank element is about equal to the outside diameter of the conventional shank. With the proportions shown, the edgewise bending strength and stiffness properties of this section are substantially the same as those of the conventional shank, i. e. the stresses due to the principal (lift) aerodynamic forces will be approximately the same as conventional.

In flatwise bending, however, the relative stiffness properties of the conventional and flat-shanks are 25 and 1.6 respectively, i. e. a reduction in the stiffness factor and an increase in bending deflection (per unit of length) of 15–1.

The cross-sectional area of the new flat shank section may be the same as that of the replaced hollow shank, whereby the stresses from centrifugal force will be the same in both cases.

The aerodynamic forces for one particular case and flight regime are shown to scale on the force diagram of Fig. 1 and it will be seen that the flatwise bending moment on the shank section in this instance is $\frac{1}{10}$ of the edgewise moment. (Since the flat shank section is disposed at right angles to the blade section, "flatwise" of the blade is "edgewise" of the shank and vice versa.) As the flat shank and blade are integral this right-angular relationship obtains at all pitch settings and hence in all flight regimes the aerodynamic bending moment flatwise of the shank section is always small.

It is estimated that the greatest flatwise shank bending stress that could occur would be in case it were possible to apply full accelerating torque with the propeller blade maintained in "flat pitch" (shank section parallel to the shaft axis). In this extreme condition some of the torque is absorbed in accelerating the engine masses, but even assuming that all could be absorbed by the propeller the acceleration bending moment on each shank of a three blade propeller would be something less than $\frac{1}{3}$ of the propeller shaft torque (neglecting the substantial centrifugal restoring moment introduced by the flexible shank which would substantially reduce the resultant bending moment). Assuming further that maximum engine speed could be reached under these other pessimistic assumptions, it has been calculated that the combined maximum stress from bending and centrifugal force will be well within normal design criteria with the proportions shown.

It is noted that, as the thickness of the flat shank section is reduced and its flexibility increased, the proportion of the bending moment balanced by the centrifugal restoring moment, to the relief of the shank, is increased and accordingly the shank bending stress will tend to increase in small ratio as the design thickness of the shank is reduced.

For the above reasons it is expected that shank sections thinner and more flexible than the proportions shown will be found practicable and advantageous.

Referring now to Figures 2, 4 and 5, a conventional round blade root 20 is mounted in a conventional bearing stack 22, against the usual shoulder 24, the retention being completed by the annular nut 26 threaded into the socket 28, integral with a conventional propeller hub (not otherwise shown).

Outboard of the root 20 the flat-section shank 10 is merged with a large radius 30.

This embodiment shows a solid blade, as usual in aluminum propellers, and as previously stated, the blade section 55 is substantially at right angles to the flat shank section of the invention. Merging these two sections, without introducing sudden changes in area or profile is of prime importance in order to avoid stress concentrations. It will be seen (Figs. 3B, 3C, 3D and 3E) that this integral junction is of cruciform section, the material at the junction of the "arms" of the cross being in shear.

Liberal fillets 34, are provided as seen in Figures 3B to 3E, inclusive, and the length of the junction (Fig. 2, "A to F") is chosen so that the shear stresses are moderate. The profile of the flat shank section is tapered from full width at F—F (Fig. 2) to blend with the relatively thin blade at A—A, and percontra the normal blade width is tapered in profile from A—A to blend with the thin section of the shank at F—F. By this means the cross sectional areas through A—A, B—B, C—C, D—D, E—E and F—F (Fig. 2) may be kept constant or may change progressively and uniformly in the case where the sectional area of the shank at F—F is greater than that of the blade at A—A.

Obviously, at the upper section A—A the cross sectional area is that of the blade airfoil itself, since the "arms" representing the shank element become of zero height at this merging point; and similarly a section through F—F would show the rectangular section 10 of the shank itself since the "arms" representing the blade element also become of zero height at this merging point. Intermediate these points the union of the blade and shank is of cruciform section without any substantial change in area between adjacent sections such as would engender stress concentrations.

The blade is provided with a streamlined cuff 37 comprising two similar half shells 36, 36 each rigid with half of a base plate 38, having a circular flange 40 to which is piloted and bolted as at 41 a parti-spherical damper ring 42. A companion spherical ring 44 is provided on the hub 28, a friction lining 46 being interposed between the spherical damper members 42 and 44.

Towards their outer ends the cuff shells have rigid bosses 48 (Fig. 3C) abutting in the plane of the blade and secured by bolts 50. These bosses are closely, but slidably, fitted over abutments 52 formed on the blade so that the top end of the cuff is constrained to follow any lateral vibration or rocking motion of the blade at the abutment zone.

The cuff 37 thus acts as a torque-arm, transmitting any small displacement at the blade abutments 52 relative to the hub 28, as a sliding motion at the spherical damper lining 46 providing a rocking movement between the cuff and hub.

This lining 46 is subject to the centrifugal force of the cuff 37 which is thus restrained from radial displacement. It will be seen that this damper 46 is effective under any vibratory displacement originating in the bearing stack 22 or in the flexible shank 10.

It will be noted that, within the conventional length of the cuff 37, there is room for a substantial length of flat section 10, affording drastically increased flexibility as compared to the conventional shank indicated in outline by the dotted lines 54. This increased flexibility will correspondingly reduce the natural edgewise frequency of vibration in the fundamental mode, i. e. with a single node near the blade root. The frequency of multi-noded modes of vibration will be less affected but, nevertheless, the friction damper of this invention will be effective against all modes of vibration (even torsional) excepting only any which might have a node of zero translation located near the abutment 52.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

I claim:

1. A propeller blade for mounting on a hub comprising in combination, a root portion of circular section, a blade portion of airfoil section spaced from said root section, and, a flexible shank of flat section disposed normal to a chord of said airfoil and uniting said portions, the thickness of said flat section being less than ⅓ of its width.

2. A propeller blade for mounting on a hub comprising in combination, a root portion of circular cross section, a blade portion of airfoil section, and, a shank of flat section disposed normal to a chord of said airfoil and uniting said portions.

3. A propeller blade for mounting on a hub comprising in combination, a root portion of circular cross section, a blade portion of airfoil section, and, a shank of elongate cross section disposed normal to a chord of said airfoil and uniting said portions.

4. In combination, a propeller having the usual flattish cross blade section and a hub-mounted portion of circular section united by a flexible shank of flat section disposed crosswise to and partly overlapping said airfoil to form a cruciform union therewith.

5. In combination, a propeller having the usual flattish cross blade section and a hub-mounted portion of circular section united by a flexible shank of flat section disposed crosswise to and partly overlapping said airfoil to form a cruciform union therewith, the width profiles of said overlapping blade and shank being respectively reversely tapered with respect to each other down to the thickness of the other, so that any change in sectional area between the blade and shank portions is gradual throughout said cruciform junction.

6. In combination, a propeller having the usual flattish cross blade section, a hub-mounted portion of said blade of circular cross section, and a shank of flat section uniting said blade and hub-mounted portions, said shank being disposed crosswise to and partly overlapping said airfoil to form a cruciform union therewith.

7. In combination, a propeller blade having an airfoil portion and a root portion for mounting in a hub socket, said portions being united by a shank of flat section disposed at right angles to a chord of said blade thereby flexible for edgewise deflection of said blade, a cuff embracing said shank, means to constrain said cuff to rock with blade deflection and damping means between the inboard end of said cuff and said hub.

8. In a propeller having a hub and a blade, a blade root mounted in said hub, a shank of flat cross-section comprising flexible means uniting said blade and root, a rigid cuff member embracing said flexible means and adapted to partake of any deflection thereof, and damping means between said cuff and hub.

9. In a propeller having a hub and a blade of airfoil section, a blade root mounted in said hub, means of elongate cross section disposed normal to a chord of said airfoil and uniting said blade and root, a rigid cuff member surrounding said means and adapted to partake of any deflection thereof, and damping means between said cuff and hub.

10. In combination, a propeller hub having a blade mounting socket, a cuff, rocking damping means connecting said cuff and socket, a propeller blade having a flexible shank of flat cross-section disposed within said cuff and mounted in said socket, the outboard portion of said cuff being connected to said blade to cause the cuff to rock on said damper means upon deflection of said flexible portion.

11. In combination, a propeller hub having a blade mounting socket, a cuff, rocking damping means connecting said cuff and socket, a propeller blade of airfoil section, a shank of flat cross section disposed normal to a chord of said airfoil, said shank being within said cuff and mounted in said socket, the outboard portion of said cuff being connected to said blade to cause the cuff to rock on said damper means upon deflection of said shank.

12. A propeller having the usual flattish cross blade section, a flexible shank of flat section partly overlapping said blade to form a cruciform union, the overlapping parts of the blade and shank being each reversely tapered with respect to each other in width to merge with the thickness of the other.

13. A propeller having the usual flattish cross blade section, a shank of flat section partly overlapping said blade to form a cruciform union, the overlapping parts of the blade and shank being each reversely tapered with respect to each other in width to merge with the thickness of the other.

14. A propeller including a hub socket having a spherical surface, a cuff having damping coaction with said surface, a blade having a butt mounted for pitch change in said socket, a flexible shank of flat cross-section within said cuff and uniting said butt and blade and disposed crosswise of the latter, and means constraining said cuff to be rocked on said spherical surface by any deflection of said shank.

15. A propeller including a hub socket having a spherical surface, a cuff having damping coaction with said surface, a blade having a butt mounted for pitch change in said socket, a shank of flat cross-section within said cuff and uniting said butt and blade and disposed crosswise of the latter, and means constraining said cuff to be rocked on said spherical surface by any deflection of said shank.

16. A propeller including a hub socket having a spherical surface, a cuff having damping co-action with said surface, a blade having a butt mounted for pitch change in said socket, a shank of elongate cross-section within said cuff and uniting said butt and blade and disposed crosswise of the latter, and means constraining said cuff to be rocked on said spherical surface by any deflection of said shank.

17. In a propeller having a blade mounting socket, a blade shank mounted in said socket and extending therefrom, said shank being subject in operation to vibrating lateral deflections, and a cuff surrounding said socket, vibration damping means comprising in combination, a connection between the outer end of said cuff and said blade through which connection said cuff is displaced with any lateral deflection of said shank, a first damper member rigid with said socket, and a second damper member rigid with the inner end of said cuff and in frictional sliding damping co-action with and inboard of said first member with respect to the axis of rotation of the propeller.

18. In a propeller, in combination, a blade mounting socket, a friction member rigid therewith, a blade shank extending from said socket, a cuff embracing said blade shank and engaged therewith at the outer end only of said cuff, to force said cuff to partake of any vibratory deflection of said shank, said cuff being engaged at its inner end only with said friction member and said latter engagement comprising a friction damper having sliding co-action under such deflection.

19. In a propeller blade for attachment to a hub and having the usual elongate cross-section whereby the blade in bending is relatively stiff edgewise and flexible flatwise, a shank portion for said blade having similar characteristics but disposed in a plane substantially normal to a chord of the propeller blade whereby the combination of the blade and shank is flexible both flatwse and edgewise of the blade, and a blade root at the inboard end of said shank portion comprising said attachment.

20. In a propeller blade of the usual flattish cross-section whereby the blade in bending is relatively stiff edgewise and flexible flatwise, a shank portion for said blade having similar characteristics but disposed in a plane substantially normal to a chord of the propeller blade whereby the combination of the blade and shank is flexible both flatwise and edgewise of the blade, said shank and blade portions being partly overlapped to form a cruciform union whereof the width profiles of said shank and blade portions are reversely tapered with respect to each other so that the overlapping portion changes gradually in cross sectional area from the sectional area of the shank to the sectional area of the blade.

21. For attachment to a hub, a propeller blade of airfoil section having the usual elongate form whereby the blade in bending is relatively stiff edgewise and flexible flatwise, a shank portion of elongate cross section disposed in a plane substantially normal to a chord of the propeller blade, whereby the combination of the blade and shank is flexible both flatwise and edgewise of the blade, and a blade root at the inboard end of said shank portion comprising said attachment.

22. In a propeller blade of airfoil section having the usual flattish cross-sectional form whereby the blade in bending is relatively stiff edgewise and flexible flatwise, a shank portion of flat cross section disposed in a plane substantially normal to a chord of the propeller blade, whereby the combination of the blade and shank is flexible both flatwise and edgewise of the blade, the said shank and blade portions being partly overlapped to form a cruciform union whereof the width profiles of said shank and blade portions are reversely tapered with respect to each other so that the overlapping portion changes gradually in cross-sectional area from the cross-sectional area of the shank to the cross-sectional area of the blade.

References Cited in the file of this patent

UNITED STATES PATENTS

| Number | Name | Date |
| --- | --- | --- |
| 614,094 | McKechnie | Nov. 29, 1898 |
| 1,384,672 | Murray | July 12, 1921 |
| 1,638,695 | Leitner | Aug. 9, 1927 |
| 2,083,993 | Hall | June 15, 1937 |
| 2,289,400 | Woods | July 14, 1942 |
| 2,298,021 | Presser | Oct. 6, 1942 |
| 2,385,070 | Gant | Sept. 18, 1945 |
| 2,438,542 | Cushman | Mar. 30, 1948 |
| 2,440,115 | Palmatier | Apr. 20, 1948 |
| 2,457,325 | Sidell | Dec. 28, 1948 |
| 2,478,252 | Dean | Aug. 9, 1949 |

FOREIGN PATENTS

| Number | Country | Date |
| --- | --- | --- |
| 521,487 | France | Mar. 5, 1921 |
| 595,288 | France | July 13, 1925 |